UNITED STATES PATENT OFFICE 2,572,394

METALLIZABLE MONOAZO DYESTUFFS

Hans Ruckstuhl, Otto Senn, and Walter Wehrli, Basel, Switzerland, assignors to Sandoz A. G., Basel, Switzerland, a Swiss firm No Drawing. Application January 16, 1950, Serial No. 138,932. In Switzerland January 21, 1949

6 Claims. (Cl. 260—162)

The present invention relates to new metallizable monoazo dyestuffs and to the manufacture thereof.

It has been found according to the present invention that valuable monoazo dyestuffs are obtained from diazotized phenylamides of 1-hydroxy - 2 - aminobenzene - sulphonic acid, in which the phenylamidosulphonic acid group is in the 4-, 5- or 6-position, by coupling them with the amides of 1-phenyl-5-pyrazolone-3-carboxylic acid, in which one hydrogen atom of the carboxylic amide group can be replaced by methyl or ethyl. If the carboxylic amide group in the dyestuff which is formed is unsubstituted then there may a methyl or methoxy group or a halogen atom present in not more than one of the phenyl radicals.

As diazo components there can be used for example the following compounds:

The anilide of 1-hydroxy-2-aminobenzene-4-sulphonic acid, the anilide of 1-hydroxy-2-aminobenzene-5-sulphonic acid, as well as the derivatives of these compounds substituted in the phenyl of the phenylamido group by at most one methyl- or methoxy group or one halogen atom and also 1-hydroxy-2-amino-4-chlorbenzene-5-sulphonic acid anilide, 1-hydroxy-2-amino-4-chlorbenzene-6-sulphonic acid anilide, 1 - hydroxy - 2 - amino - 4 - methylbenzene - 5 - sulphonic acid anilide, 1-hydroxy-2-amino-4-methylbenzene - 6 - sulphonic acid anilide, 1-hydroxy - 2 - amino - 6 - chlorbenzene - 4 -sulphonic acid anilide, 1-hydroxy-2-amino-6-methylbenzene-4-sulphonic acid anidide.

As coupling components there can for example be used the amide of 1-phenyl-5-pyrazolone-3-carboxylic acid, which can be substituted in the phenyl radical by at most one methyl- or methoxy group or one halogen atom, or there can be used the methyl- or ethyl amide of 1-phenyl-5-pyrazolone-3-carboxylic acid.

The dyestuffs obtained according to the present process give by chrome dyeing on wool deep yellowish-red to Bordeaux red shades. They are particularly suitable for the neutral single bath chroming process. They possess excellent fastness to light with good fastness properties in other respects.

The following examples illustrate the invention without limiting it in any way. The parts are parts by weight.

Example 1

26.4 parts of 2-amino-1-hydroxybenzene-4-sulphonic acid anilide are indirectly diazotized in the usual manner with 6.9 parts of sodium nitrite, and the diazo suspension is coupled with 21 parts of 1-phenyl-5-pyrazolone-3-carboxylic acid amide which is dissolved in 100 parts of water with an excess of ammonia. After stirring for several hours at 10–15° C., the dyestuff which has precipitated is isolated. In the dry state the dyestuff, which corresponds to the formula

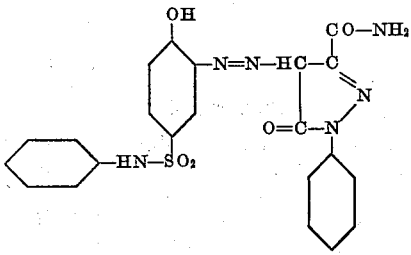

is a brown-red powder which dissolves in concentrated sulphuric acid with a yellow-orange color. In dilute caustic soda solution the dyestuff dissolves with a yellowish-red color.

Wool is dyed therewith yellowish-red by afterchroming or by the neutral metachrome process.

The dyeings possess most outstanding fastness to light, very good fastness to carbonizing and good wet fastnesses.

Example 2

26.4 parts of 2-amino-1-hydroxybenzene-5-sulphonic acid anilide are indirectly diazotized in the usual way and the diazo suspension is coupled with 21 parts of 1-phenyl-5-pyrazolone-3-carboxylic acid amide which is dissolved in 100 parts of water with an excess of ammonia. After stirring for several hours at 10–15° C. the precipitated dyestuff is isolated.

When dry the dyestuff, which corresponds to the formula

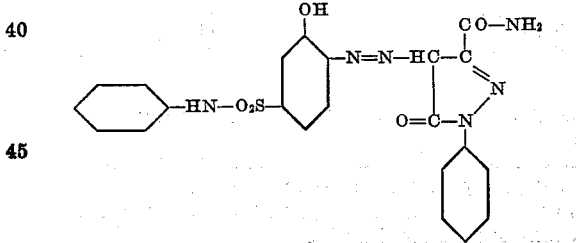

is a brown-red powder which dissolves in concentrated sulphuric acid with a yellowish-orange color. The dyestuff dissolves in dilute caustic soda solution with a yellowish-red color.

The new dyestuff gives in chrome dyeings bluish-red shades of excellent fastness to light, very good fastness to carbonization and good wet fastnesses.

Example 3

29.8 parts of 2-amino-4-chloro-1-hydroxybenzene-6-sulphonic acid anilide are indirectly diazotized in the usual manner with 6.9 parts of sodium nitrite, and the diazo suspension is coupled with 21 parts of 1-phenyl-5-pyrazolone-3-carboxylic acid amide which is dissolved in 100 parts of water with an excess of ammonia. After stirring for several hours at 10-15° C., the dyestuff which has precipitated is isolated. In the dry state the dyestuff is a brown-red powder which dissolves in concentrated sulphuric acid and in dilute caustic soda solution with a brick-red color.

Wool is dyed thereby bluish-red by after-chroming or by the neutral metachrome process.

The dyestuff corresponds to the formula

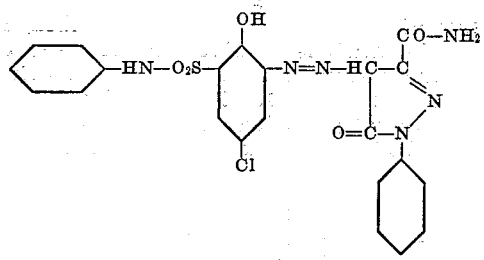

Example 4

26.4 parts of 2-amino-1-hydroxybenzene-4-sulphonic acid anilide are indirectly diazotized in the usual manner with 6.9 parts of sodium nitrite, and the diazo suspension is coupled with 23 parts of 1-phenyl-5-pyrazolone-3-carboxylic acid methylamide which is dissolved in 150 parts of water with an excess of ammonia. After stirring for several hours at 10-15° C., the dyestuff which has precipitated is isolated. In the dry state, the dyestuff is a brown-red powder which dissolves in concentrated sulphuric acid and in dilute caustic soda solution with a yellowish-red color.

Wool is dyed thereby yellowish-red by after-chroming or by the neutral metachrome process. The dyeings possess outstanding fastness to light, very good fastness to carbonizing and good wet fastnesses.

A dyestuff of similar properties is obtained, if 1-phenyl-5-pyrazolone-3-carboxylic acid methyl amide is replaced by 1-phenyl-5-pyrazolone-3-carboxylic acid ethyl amide.

Example 5

26.4 parts of 2-amino-1-hydroxybenzene-5-sulfonic acid anilide are indirectly diazotized in the usual manner with 6.9 parts of sodium nitrite, and the diazo suspension is coupled with 24.5 parts of 1-(2'-methoxy-phenyl)-5-pyrazolone-3-carboxylic acid amide which is dissolved in 150 parts of water with an excess of ammonia. After stirring for several hours at 10-15° C., the dyestuff which has precipitated is isolated. In the dry state the dyestuff is a brown-red powder which dissolves in concentrated sulphuric acid and in dilute caustic soda solution with a brick-red color.

Wool is dyed thereby in full bluish-red shades by after-chroming or by the neutral metachrome process. The dyeings possess outstanding fastness to light, very good fastness to carbonizing and good wet fastnesses.

Example 6

27.8 parts of 2-amino-1-hydroxybenzene-5-sulphonic acid-3'-methylanilide are indirectly diazotized in the usual manner with 6.9 parts of sodium nitrite, and the diazo suspension is coupled with 21 parts of 1-phenyl-5-pyrazolone-3-carboxylic acid amide which is dissolved in 100 parts of water with an excess of ammonia. After stirring for several hours at 10-15° C., the dyestuff which has precipitated is isolated. In the dry state the dyestuff, which corresponds to the formula

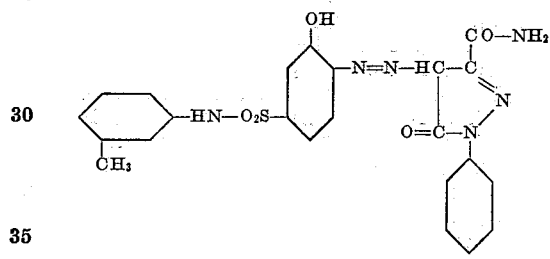

is a brown red powder which dissolves in concentrated sulphuric acid and in dilute caustic soda solution with a yellowish-red color.

Wool is dyed thereby full bluish-red shades by after-chroming or by the neutral metachrome process. The dyeings possess outstanding fastness to light, very good fastness to carbonizing and good wet fastnesses.

Further examples with data of the dyeing properties are summarized in the following table:

| | Diazo component | Azo component | After-chrome dyeing on wool |
|---|---|---|---|
| 7 | 1-hydroxy-2-aminobenzene-4-sulphonic acid anilide | 1-(3'-chlorophenyl)-5-pyrazolone-3-carboxylic acid amide | yellowish-red. |
| 8 | 1-hydroxy-2-aminobenzene-5-sulphonic acid anilide | 1-(4'-methylphenyl)-5-pyrazolone-3-carboxylic acid amide | bluish-red. |
| 9 | 1-hydroxy-2-aminobenzene-4-sulphonic acid-4'-chloroanilide | 1-phenyl-5-pyrazolone-3-carboxylic acid amide | yellowish-red. |
| 10 | 1-hydroxy-2-aminobenzene-5-sulphonic acid-2'-chloroanilide | 1-phenyl-5-pyrazolone-3-carboxylic acid amide | bluish-red. |
| 11 | 1-hydroxy-2-aminobenzene-5-sulphonic acid 3'-methoxyanilide. | 1-phenyl-5-pyrazolone-3-carboxylic acid amide | Do. |
| 12 | 1-hydroxy-2-aminobenzene-5-sulphonic acid-4'-methoxyanilide. | 1-phenyl-5-pyrazolone-3-carboxylic acid amide | Do. |
| 13 | 1-hydroxy-2-amino-4-chlorobenzene-5-sulphonic acid anilide | 1-phenyl-5-pyrazolone-3-carboxylic acid amide | reddish-Bordeaux. |
| 14 | 1-hydroxy-2-amino-4-methyl-6-sulphonic acid anilide | 1-phenyl-5-pyrazolone-3-carboxylic acid amide | bluish-red. |
| 15 | 1-hydroxy-2-amino-6-chlorobenzene-4-sulphonic acid anilide | 1-phenyl-5-pyrazolone-3-carboxylic acid amide | yellowish-red. |
| 16 | 1-hydroxy-2-amino-6-methylbenzene-4-sulphonic acid anilide | 1-phenyl-5-pyrazolone-3-carboxylic acid amide | Do. |

The procedure in each of these further examples is precisely analogous to that set forth in the preceding examples.

The dyestuff of the formula:

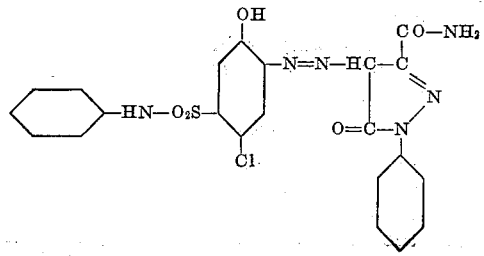

What we claim is:

1. A new metallizable monoazo dyestuff of the general formula

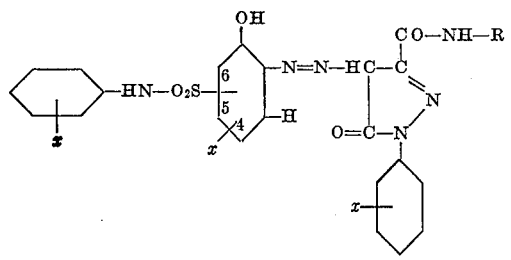

wherein one $x$ stands for a member selected from the group consisting of hydrogen, methyl, methoxy and chlorine, the other $x$'s being hydrogen, wherein R represents a member selected from the group consisting of hydrogen and lower alkyl, if all $x$'s are hydrogen, and is hydrogen, if one $x$ denotes a member selected from the group consisting of methyl, methoxy and chlorine, and wherein the group is in one of the unoccupied positions designated 4, 5 and 6.

2. The new metallizable monoazo dyestuff of the formula

3. The new metallizable monoazo dystuff of the formula

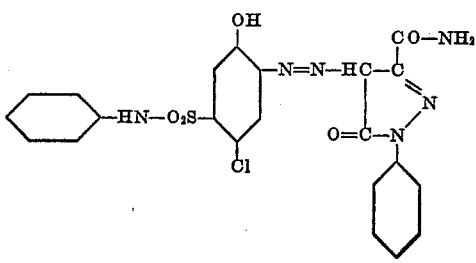

4. The new metallizable monoazo dyestuff of the formula

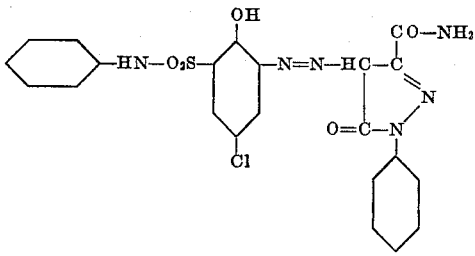

5. The new metallizable monoazo dyestuff of the formula

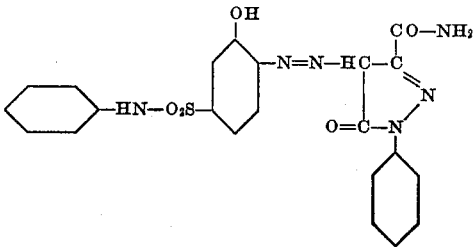

6. The new metallizable monoazo dyestuff of the formula

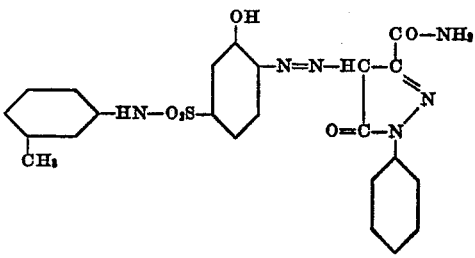

HANS RUCKSTUHL.
OTTO SENN.
WALTER WEHRLI.

REFERENCES CITED

The following references are of record in the file of this patent:

UNITED STATES PATENTS

| Number | Name | Date |
|---|---|---|
| 1,874,474 | Eichwede et al. | Aug. 30, 1932 |
| 2,024,864 | Kopp et al. | Dec. 17, 1935 |